US010437227B2

(12) United States Patent
Shinoda et al.

(10) Patent No.: US 10,437,227 B2
(45) Date of Patent: Oct. 8, 2019

(54) MOTOR DRIVE SYSTEM INCLUDING ABNORMALITY DETECTION UNIT OF POWER STORAGE DEVICE

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/995,161

(22) Filed: Jun. 1, 2018

(65) Prior Publication Data

US 2018/0356791 A1 Dec. 13, 2018

(30) Foreign Application Priority Data

Jun. 9, 2017 (JP) ................................. 2017-114207

(51) Int. Cl.
*H02P 29/02* (2016.01)
*H02P 29/028* (2016.01)
*G05B 19/406* (2006.01)
*H02P 29/032* (2016.01)
*H02K 7/02* (2006.01)

(52) U.S. Cl.
CPC ............ *G05B 19/406* (2013.01); *H02P 29/02* (2013.01); *H02P 29/028* (2013.01); *H02P 29/032* (2016.02); *G05B 2219/34465* (2013.01); *G05B 2219/41002* (2013.01); *H02K 7/025* (2013.01)

(58) Field of Classification Search
USPC ................. 318/560, 561, 563, 565; 388/909
See application file for complete search history.

(56) References Cited

U.S. PATENT DOCUMENTS

| 4,449,088 A * | 5/1984 | Cutler | .................. H02M 7/521 |
| | | | 318/798 |
| 8,643,383 B2 * | 2/2014 | Xiao | .................... H02H 7/1203 |
| | | | 318/445 |
| 2008/0123225 A1 * | 5/2008 | Matsubara | .............. H02M 1/32 |
| | | | 361/15 |
| 2014/0049215 A1 * | 2/2014 | Fassnacht | ............. B60L 3/0023 |
| | | | 320/109 |

(Continued)

FOREIGN PATENT DOCUMENTS

| JP | 2013-9524 A | 1/2013 |
| JP | 2016-46833 A | 4/2016 |
| JP | 2016-168920 A | 9/2016 |

*Primary Examiner* — Bentsu Ro
(74) *Attorney, Agent, or Firm* — Hauptman Ham, LLP

(57) ABSTRACT

A motor drive system includes a power supply unit configured to supply DC power to a DC link, a servo amplifier for drive configured to convert the DC power in the DC link to AC power and supplies the AC power to the servomotor for drive as a driving power, a power storage device configured to store DC power from the DC link or supplies DC power to the DC link, an abnormality detection unit configured to detect the abnormality of the power storage device, and a control unit configured to, when the abnormality detection unit detects the abnormality of the power storage device, control the operation of the servo amplifier for drive such that the output of the servomotor for drive is limited to a value smaller than the output before the abnormality detection by the abnormality detection unit.

8 Claims, 10 Drawing Sheets

(56) References Cited

U.S. PATENT DOCUMENTS

2016/0380571 A1* 12/2016 Yoshida .............. H02H 7/1216
                                                    318/504
2018/0123498 A1*  5/2018 Tanabe ................ G05B 19/058
2018/0212549 A1*  7/2018 Yoshida ................. H02M 1/32
2018/0278052 A1*  9/2018 Yoshida ............... H02P 29/032

* cited by examiner

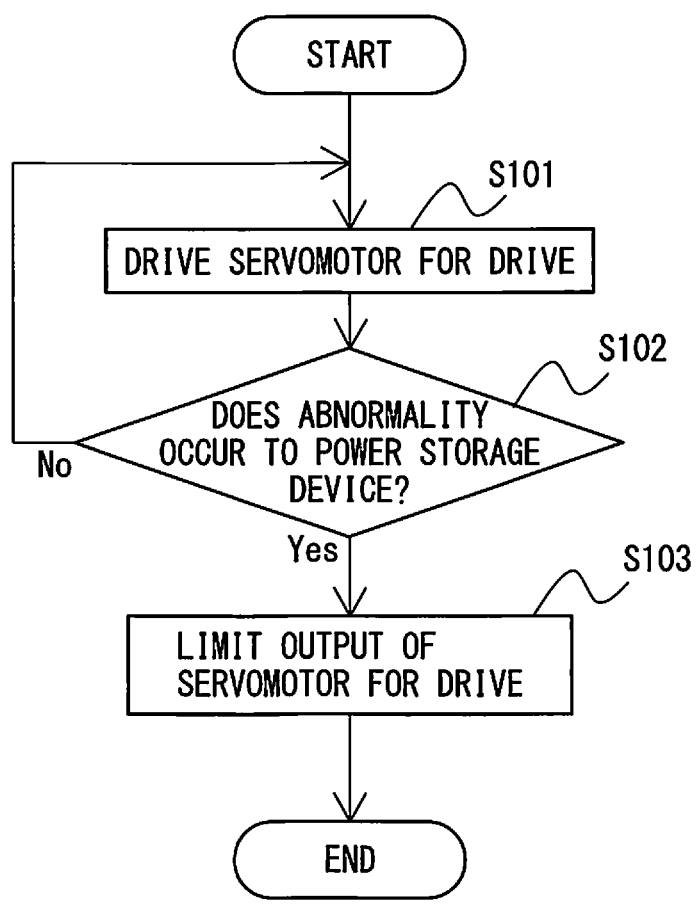

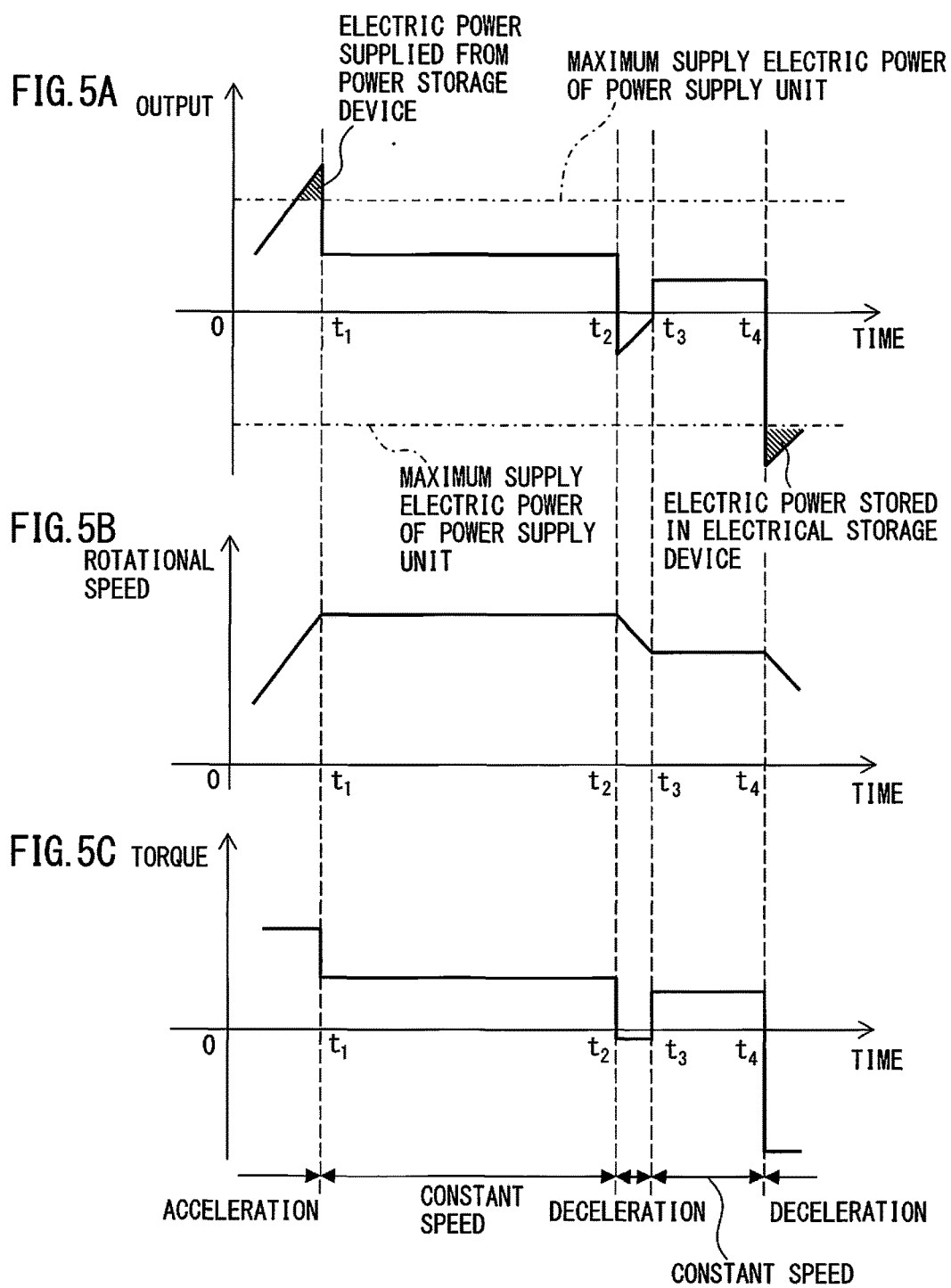

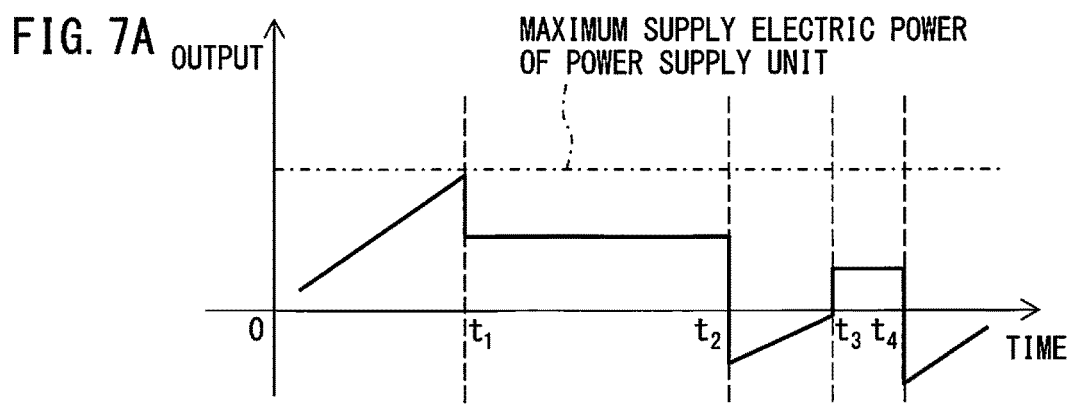
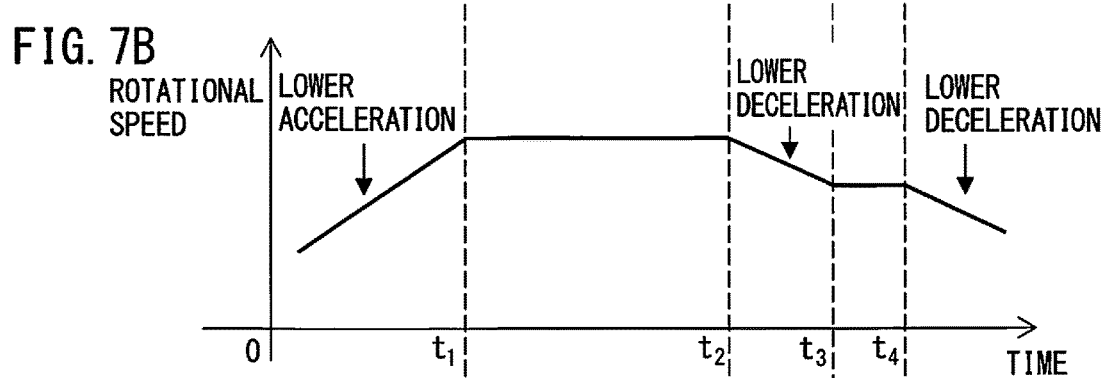
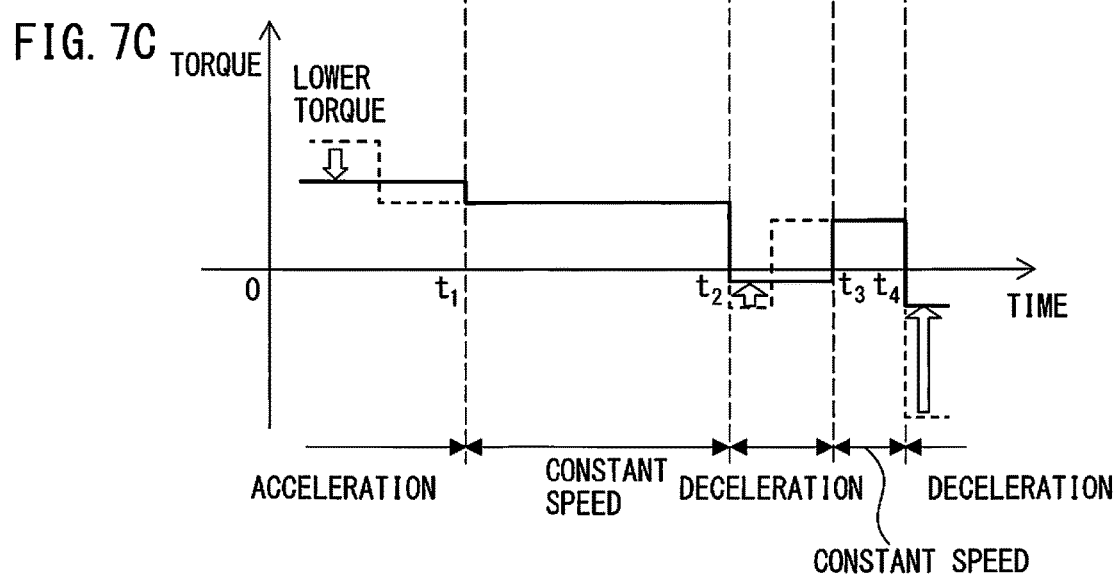

MOTOR DRIVE SYSTEM INCLUDING ABNORMALITY DETECTION UNIT OF POWER STORAGE DEVICE

RELATED APPLICATIONS

The present application claims priority of Japanese Application Number 2017-114207, filed on Jun. 9, 2017, the disclosure of which is hereby incorporated by reference herein in its entirety.

BACKGROUND OF THE INVENTION

1. Field of the Invention

The present invention relates to a motor drive system including an abnormality detection unit of a power storage device.

2. Description of the Related Art

In a motor drive system for driving a servomotor provided to machines including a machine tool, a robot etc., (hereinafter referred to as "servomotor for drive"), AC power supplied from an AC source is, via a converter, converted into DC power to be output to a DC link, via an inverter, DC power of the DC link is converted into AC power, and the AC power is used as a driving power of a servomotor for drive. In general, a single converter is provided relative to the inverters to reduce the cost and a space of occupancy of the motor drive system. In other words, a converter for converting AC power supplied from the AC source into DC power is assumed to be a common power supply unit, and servo amplifiers for drive (inverters) generate AC power for driving each servomotor for drive by using the DC power output from the power supply unit.

When, in the motor drive system, the servomotor for drive is controlled to accelerate or decelerate the servomotor for drive, a large output or the regeneration of the AC power is needed for the AC source, and thus, a power peak occurs. In particular, in the motor drive system in which the single power supply unit (converter) is connected with the servo amplifiers for drive (inverters), the caused power peak can be larger. As the power peak increases, the capacity of the power supply unit or the operational cost of the motor drive system increases, and thus, it is desirable to reduce the power peak.

A method has been conventionally used in which, in order to reduce the power peak, the storage device, which can store DC power, is provided to the DC link that connects the power supply unit of the motor drive system with the servo amplifier for drive, and the energy consumed and regenerated by the servomotor for drive is appropriately exchanged via the DC link. According to this method, it is possible to store the regenerative power generated from the servomotor for drive at the time of deceleration of the servomotor for drive in the storage device and reuse the stored electric power at the time of acceleration of the servomotor for drive, and thus, it is possible to reduce the power peak. In other words, by using the power storage device configured to perform the input/output of the electric power to/from the DC link, it is possible to cope with the operation (acceleration/deceleration) of the servomotor for drive involving the power consumption higher than the maximum output power of the power supply unit.

As one example, a press machine has a very large maximum power consumption generated when the press operation is performed, and there is a case where the shortage of the capacity of the power supply unit is a problem. In the motor drive system in the press machine, to the DC link, the power storage device is provided and when the press machine consumes the electric power, from the power storage device, the electric power is supplied so that the press machine can be driven under the power supply unit having the small capacity.

Examples of the power storage device include a device that uses a flywheel that can store a rotation energy, a device that uses a capacitor having a large capacity, etc.

For example, as disclosed in Japanese Unexamined Patent Publication (Kokai) No. 2013-009524, a motor drive device is known that includes an AC-DC converter for converting the AC power from the AC source into the DC power; a DC-AC converter that converts the DC power into the AC power for driving the motor or converts the AC power regenerated from the motor into the DC power; a DC link unit that is connected with a DC side of the AC-DC converter and a DC side of the DC-AC converter and exchanges the DC power; an energy storage unit including at least one capacitor storage unit and at least one flywheel storage unit that is connected with the DC link unit, stores the DC power from the DC link unit, or supplies the DC power to the DC link unit; a motor control unit, based on a motor operation command for commanding operations of the motor, controls the DC-AC converter such that the DC-AC converter outputs the desired AC power; and an energy control unit that controls the energy storage unit such that the energy storage unit stores the DC power from the DC link unit or supplies the DC power to the DC link unit.

For example, as disclosed in Japanese Unexamined Patent Publication (Kokai) No. 2016-046833, a control system of a servomotor that drives axes of an industrial machine or a machine tool is known, which system includes a first servomotors for driving the axes; converters for converting an AC voltage into a DC voltage; first inverters that receive the DC voltage from the converter, convert the DC voltage into the AC voltage for driving the first servomotors, or convert the AC power regenerated from the first servomotor into the DC power; a second servomotor that rotates a inertia; second inverters that receive a DC voltage from the converter, convert the DC voltage into the AC voltage for driving the second servomotor, or convert the AC power regenerated from the second servomotor into the DC power; and a servomotor control device that controls the first servomotors and the second servomotor, in which the number of the second servomotor is smaller than the number of the second inverters, at least one of the second servomotors includes independent winding wires, and at least a part of the second inverters is connected with the independent winding wires provided in the single second servomotor.

SUMMARY OF THE INVENTION

In the motor drive system in which, the power storage device is provided to the DC link that connects the power supply unit with the servo amplifier for drive, when some kind of abnormality (failure) occurs in the power storage device and the operation is difficult, if by the servo amplifier for drive, the servomotor for drive is driven as usual, the power consumption or the regenerative power of the servomotor for drive exceeds the maximum output power of the power supply unit. As a result, there is a possibility of inviting the abnormal operation or the breakage of the servomotor for drive and the breakage of the power supply unit and the servo amplifier for drive. On the other hand, when the abnormality occurs in the power storage device and the servomotors for drive are stopped uniformly, although it is possible to avoid the abnormal operation or the breakage of the servomotor for drive, since the machines such as the machine tool and the robot to which the motor drive system is incorporated are stopped, a large economic loss occurs. Accordingly, in the motor drive system having such power storage device, there is a demand for a technique that can ensure the efficient driving and safety of the servomotor for drive as the handling when the abnormality occurs in the power storage device.

According to one aspect of the present disclosure, the motor drive system includes the power supply unit configured to supply DC power to a DC link; the servo amplifier for drive configured to convert DC power in the DC link to AC power and supplies the AC power to the servomotor for drive as the driving power; the power storage device configured to store DC power from the DC link and supplies DC power to the DC link; the abnormality detection unit configured to detect the abnormality of the power storage device; and a control unit configured to control the operation of the servo amplifier for drive such that the output of the servomotor for drive is limited to a value smaller than the output before the abnormality detection by the abnormality detection unit when the abnormality detection unit detects the abnormality of the power storage device.

BRIEF DESCRIPTION OF THE DRAWINGS

The present invention will be more clearly understood with reference to the following accompanying drawings:

FIG. 4 is a flowchart illustrating the operation flow of the control unit in the motor drive system according to one embodiment;

FIG. 5A is a drawing exemplifying the operation of the servomotor for drive when the power storage device normally operates, which servomotor for drive is driven by the motor drive system according to one embodiment and illustrates the output of the servomotor for drive;

FIG. 5B is a drawing exemplifying the operation of the servomotor for drive when the power storage device normally operates, which servomotor for drive is driven by the motor drive system according to one embodiment and illustrates a rotational speed of the servomotor for drive;

FIG. 5C is a drawing for exemplifying the operation of the servomotor for drive when the power storage device normally operates, which servomotor for drive is driven by the motor drive system according to one embodiment and illustrates a torque of the servomotor for drive;

FIG. 7A is a drawing exemplifying the operation of the servomotor for drive whose output is limited by the second form and the third form at the time of occurrence of an abnormality of the power storage device, which servomotor for drive is driven by the motor drive system according to one embodiment and illustrates the output of the servomotor for drive;

FIG. 7B is a drawing exemplifying the operation of the servomotor for drive whose output is limited by the second form and the third form at the time of occurrence of an abnormality of the power storage device, which servomotor for drive is driven by the motor drive system according to one embodiment and illustrates the rotational speed of the servomotor for drive;

FIG. 7C is a drawing exemplifying the operation of the servomotor for drive whose output is limited by the second form and the third form at the time of occurrence of an abnormality of the power storage device, which servomotor for drive is driven by the motor drive system according to one embodiment and illustrates the torque of the servomotor for drive;

DETAILED DESCRIPTION

Figure 1:
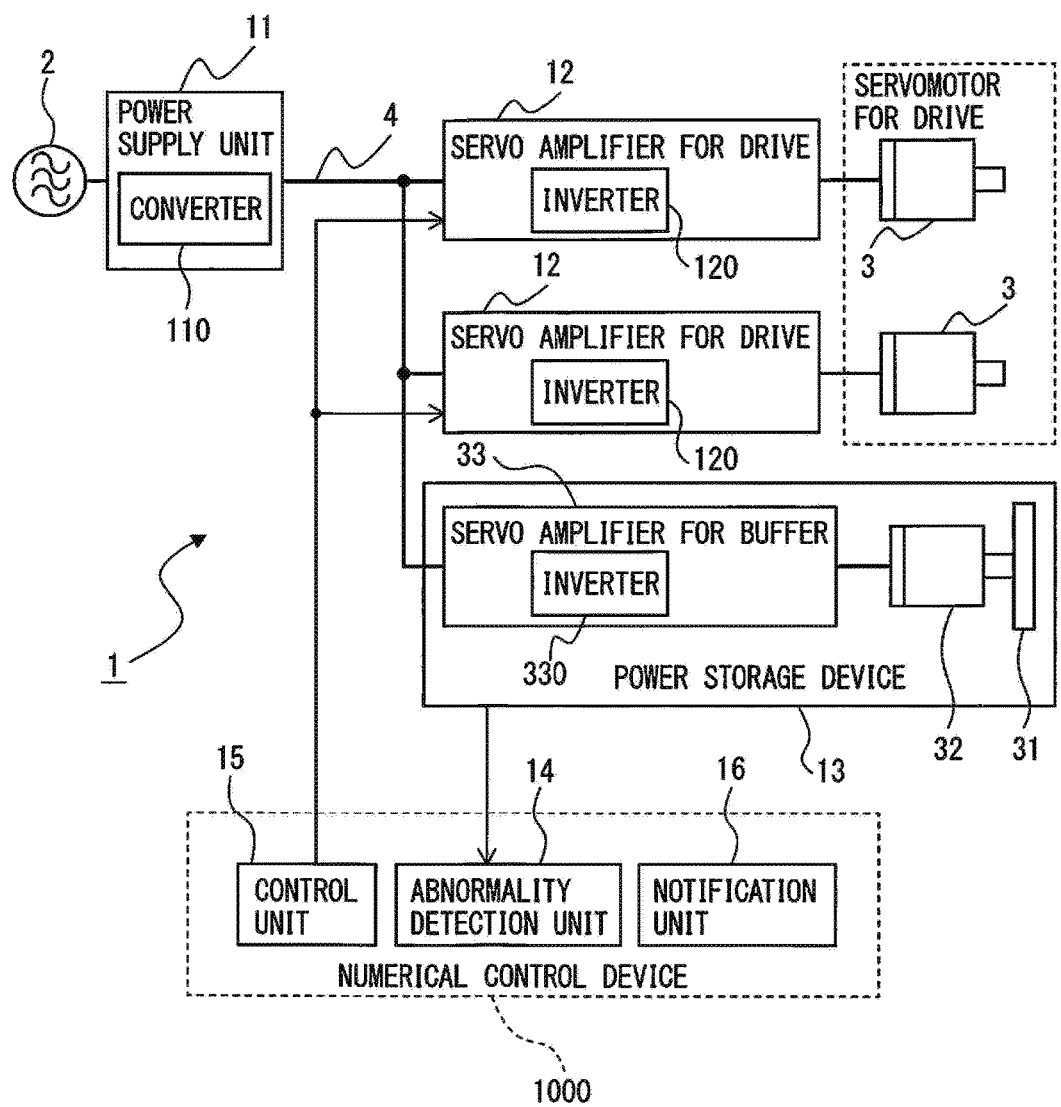
FIG. 1 is a block diagram of a motor drive system according to one embodiment.

With reference to the drawings, a motor drive system including an abnormality detection unit of a power storage device is described below. In each drawing, like members are denoted with like reference numerals. Further, components denoted with identical reference numeral in different drawing have identical functions. To facilitate the understanding, the drawing scales are appropriately changed. Further, it is assumed that the "output of the servomotor for drive" includes the "power consumption of the servomotor for drive" and the "regenerative power of the servomotor for drive."

FIG. 1 is a block diagram of the motor drive system according to one embodiment. As one example, a description is given herein of a motor drive system 1 controlling a servomotor for drive 3. In the embodiment described below, the number of phases of the servomotor for drive 3 is not especially limited in the present embodiment, and, for example, may be three phases or a single phase. Further, types of the servomotor for drive 3 are not especially limited to the present embodiment, and the types may be, for example, an induction motor or a synchronous motor. The machines provided with the servomotor for drive 3 include a machine tool, a robot, a forming machine, injection molding machines, an industrial machine, various appliances, a train, an automobile, an airplane, etc.

As illustrated in FIG. 1, the motor drive system 1 according to one embodiment includes a power supply unit 11, a servo amplifier for drive 12, a power storage device 13, an abnormality detection unit 14, a control unit 15, and a notification unit 16.

The power supply unit 11 supplies DC power to a DC link 4. In FIG. 1, the power supply unit 11 is configured from, for example, a converter 110 configured to convert AC power supplied from an AC source 2 into DC power and outputs the DC power to the DC link 4. In case that the converter 110 receives a three-phase alternating current, from the AC source 2, the converter 110 is configured from a three-phase bridge circuit, and in case that the converter 110 receives a single-phase alternating current from the AC source 2, the converter 110 is configured from a single-phase bridge circuit. Examples of the converter 110 include a diode rectifier circuit, a 120-degree conduction rectifier circuit, a rectifier circuit of a PWM switching control method, etc. For example, in case that the converter 110 is a diode rectifier circuit, the circuit rectifies the alternating current supplied from the AC source 2 and outputs the direct current to the DC link 4. For example, in case that the converter 110 is the rectifier circuit of the PWM switching control method, the circuit is configured from a switching element and a bridge circuit of a diode connected in antiparallel with the switching element, and in response to a switching command received from a numerical control device 1000, each switching element is on-off controlled and the electric power conversion is performed in an AC-DC bidirectional manner. Although examples of the switching element include a unipolar transistor such as FET, a bipolar transistor, an IGBT, a thyristor, a GTO, etc., the type of the switching element itself does not limit the present embodiment, and other switching elements may be used. In case that the converter 110 in the power supply unit 11 is configured from a device that can perform the electric power conversion in an AC-DC bidirectional manner such as the rectifier circuit of the PWM switching control method, the "maximum supply electric power of the power supply unit 11" includes both the "maximum electric power when AC power is converted into DC power" and the "maximum electric power when DC power is converted into AC power," both belonging to the converter 110 in the power supply unit 11 as the electric power conversion performance.

In case that the power supply unit 11 is configured from the converter 110, a DC link capacitor (also referred to as smoothing capacitor) is provided to the DC link 4, but the provision aspect is not illustrated in the drawings. The DC link capacitor has functions of storing DC power in the DC link 4 and suppressing the pulsation of the DC output of the converter 110 in the power supply unit 11.

The power supply unit 11 may be configured from, for example, a primary battery, a secondary battery, or a solar battery.

The servo amplifier for drive 12 is connected to the power supply unit 11 via the DC link 4. The servo amplifier for drive 12 is for driving the servomotor for drive 3 using DC power in the DC link. In general, one or more winding wires are provided to the servomotor for drive 3, and a single servo amplifier for drive 12 per a winding wire in the servomotor for drive 3 is needed to drive the servomotor for drive 3. In FIG. 1, as one example, the servomotor for drive 3 is of a single winding wires type, and thus, the single servomotor for drive 3 is connected with the single servo amplifier for drive 12.

The servo amplifier for drive 12 converts DC power in the DC link 4 to AC power and supplies the AC power to the servomotor for drive 3 as the driving power to drive the servomotor for drive 3. Accordingly, the servo amplifier for drive 12 includes, for example, an inverter 120. The inverter 120 in the servo amplifier for drive 12, based on the switching command received from the numerical control device 1000, on-off controls each switching element so that the electric power conversion is performed between DC power of the DC link 4 and AC power, i.e., the driving power or the regenerative power of the servomotor for drive 3. The inverter 120 is configured from the switching element and the bridge circuit of the diode connected in antiparallel with the switching element, and for example, based on the PWM switching control method, each switching element is on-off controlled. In case that the servomotor for drive 3 is a three-phase motor, the inverter 120 is configured from a three-phase bridge circuit and in case that the servomotor for drive 3 is a single-phase motor, the inverter 120 is configured from a single-phase bridge circuit. Although examples of the switching element include the unipolar transistor such as FET, the bipolar transistor, the IGBT, the thyristor, the GTO, etc., the type of the switching element itself does not limit the present embodiment, and other switching elements may be used.

The power storage device 13 stores DC power from the DC link 4 and supplies DC power to the DC link 4. In the embodiment illustrated in FIG. 1, the power storage device 13 includes the flywheel 31 that can store the rotation energy, a servomotor for buffer 32 having a rotation shaft to which a flywheel 31 is coupled, and a servo amplifier for buffer 33 configured to perform the conversion between DC power in the DC link 4 and AC power, i.e., the driving power or the regenerative power of the servomotor for buffer 32.

The servo amplifier for buffer 33 includes, for example, an inverter 330. The inverter 330 in the servo amplifier for buffer 33, based on the switching command received from the numerical control device 1000, on-off controls each switching element so that the electric power conversion is performed between DC power of the DC link 4 and AC power, i.e., the driving power or the regenerative power of the servomotor for buffer 32. The inverter 330 is configured from the switching element and the bridge circuit of the diode connected in antiparallel with the switching element, and for example, based on the PWM switching control method, each switching element is on-off controlled. In case that the servomotor for buffer 32 is the three-phase motor, the inverter 330 is configured from the three-phase bridge circuit and in case that the servomotor for buffer 32 is the single-phase motor, the inverter 330 is configured from the single-phase bridge circuit. Although the examples of the switching element include the unipolar transistor such as FET, the bipolar transistor, the IGBT, the thyristor, the GTO, etc., the type of the switching element itself does not limit the present embodiment, and other switching elements may be used.

The numerical control device 1000 controls a DC power amount to be stored or supplied by the power storage device 13. In other words, the numerical control device 1000 outputs, to the servo amplifier for buffer 33, a command for controlling the DC power amount to be stored or supplied by the power storage device 13 (switching command for inverter 330 in servo amplifier for buffer 33). When the command received from the numerical control device 1000 indicates the storage of the DC power by the power storage device 13, the servo amplifier for buffer 33 performs a reverse conversion operation of converting DC power in the DC link 4 into AC power so that the electric energy from the DC link 4 is taken to a side of the servomotor for buffer 32, and by the electric energy, the servomotor for buffer 32 to which the flywheel 31 is connected is caused to rotate. As a result, the electric energy flowing in from the DC link 4 is converted into the rotation energy of the flywheel 31 and is stored. When the command received from the numerical control device 1000 indicates the supply of the DC power by the power storage device 13, the servo amplifier for buffer 33 decelerates the servomotor for buffer 32 to which the flywheel 31 is connected, generates the regenerative power of the alternate current, and performs the forward conversion operation of converting AC power into DC power. Accordingly, the rotation energy stored in the flywheel 31 is converted into the electric energy and is supplied to the DC link 4. By having the power storage device 13 configured to perform the above described operations, when the servomotor for drive 3 accelerates, in addition to the energy from the power supply unit 11, the energies stored in the power storage device 13 are supplied to the servomotor for drive 3 and are used as the power for accelerating the servomotor for drive 3, and when the servomotor for drive 3 decelerates, the energy regenerated from the servomotor for drive 3 flows to the power storage device 13 and is stored. Since the electric power stored in the power storage device 13 is used for driving the servomotor for drive 3 together with the electric power supplied from the power supply unit 11, it is possible to drive the servomotor for drive 3 with the output exceeding the maximum supply electric power of the power supply unit 11.

The power storage device 13 may be configured from, for example, the capacitor having the large capacity. The case that the capacitor configures the power storage device 13 is described later with reference to FIG. 3.

The abnormality detection unit 14 detects the abnormality of the power storage device 13. The abnormalities that may occur to the power storage device 13 include, for example, the breakage of the flywheel 31, the breakage or the overheating of the servomotor for buffer 32 and the servo amplifier for buffer 33, the breaking of wire or the short-circuiting of the electric power line or the signal line in the power storage device 13, the breaking of wire of the electric power line between the DC link 4 and the power storage device 13, etc. Since a signal indicating that, to the power storage device 13, the abnormality occurs is generally transmitted to the numerical control device 1000, the abnormality detection unit 14 provided in the numerical control device 1000 may use the received signal to detect the abnormality of the power storage device 13.

The control unit 15 controls the operation of the servo amplifier for drive 12 such that, when the abnormality detection unit 14 detects the abnormality of the power storage device 13, the output of the servomotor for drive 3 is limited to a value smaller than the output before the abnormality detection by the abnormality detection unit 14. However, the above described control by the control unit 15 when the abnormality detection unit 14 detects the abnormality of the power storage device 13 is performed such that the output of the servomotor for drive 3 does not exceed the maximum supply electric power of the power supply unit 11.

Figure 2A:
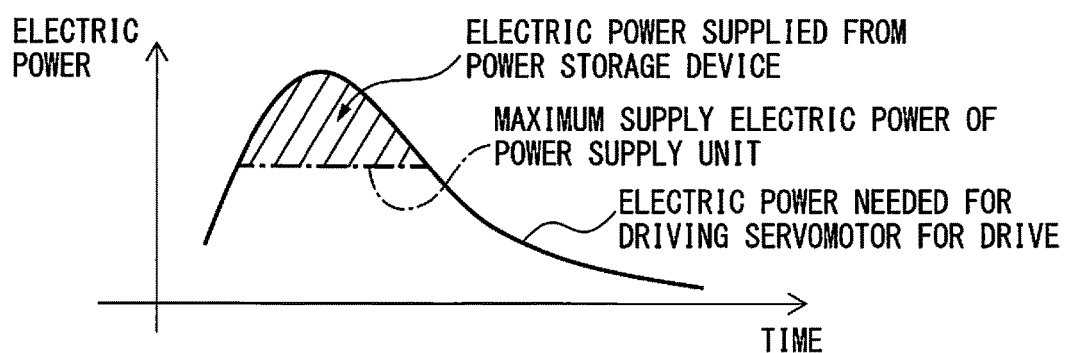
FIG. 2A is a drawing for explaining the limitation of the output of the servomotor for drive at the time of occurrence of an abnormality of the power storage device in the motor drive system according to one embodiment and exemplifies each electric power when the power storage device normally operates.
Figure 2B:
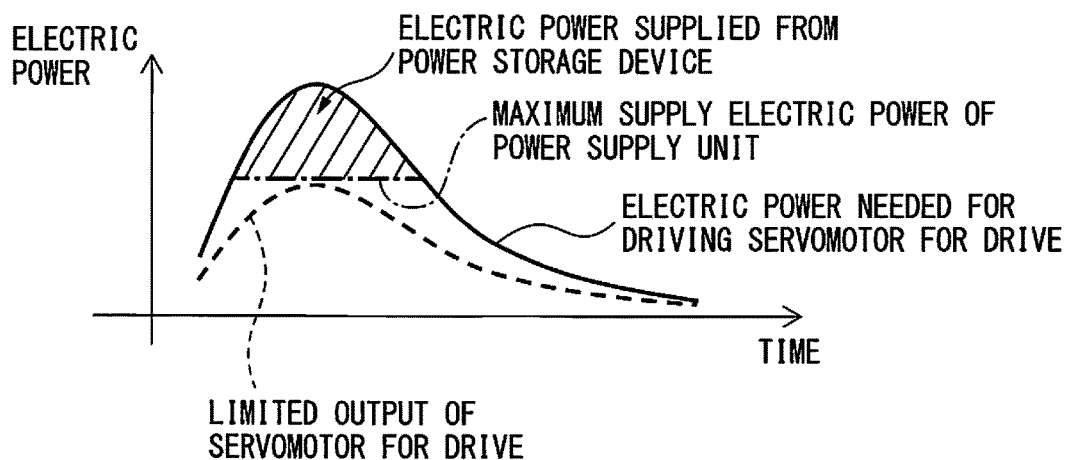
FIG. 2B is a drawing for explaining the limitation of the output of the servomotor for drive at the time of occurrence of an abnormality of the power storage device in the motor drive system according to one embodiment and exemplifies each electric power when the abnormality is caused to the power storage device and the limited output of the servomotor for drive.

FIG. 2A is a drawing for explaining the limitation of the output of the servomotor for drive at the time of occurrence of an abnormality of the power storage device in the motor drive system according to one embodiment and exemplifies each electric power when the power storage device normally operates. FIG. 2B is a drawing for explaining the limitation of the output of the servomotor for drive at the time of occurrence of an abnormality of the power storage device in the motor drive system according to one embodiment and exemplifies each electric power when the abnormality is caused to the power storage device and the limited output of the servomotor for drive. In FIG. 2A and FIG. 2B, a solid line indicates an electric power needed for driving the servomotor for drive 3 and a dot-and-dash line indicates the maximum supply electric power of the power supply unit 11. As illustrated in FIG. 2A, when the power storage device 13 normally operates, among the electric power needed for driving the servomotor for drive 3, the amount exceeding the maximum supply electric power of the power supply unit 11 (in the drawing, area indicated by oblique line) is supplemented by the electric power that is supplied from the power storage device 13 to the DC link 4. In the present embodiment, when the abnormality detection unit 14 detects the abnormality of the power storage device 13, the control unit 15 controls the operation of the servo amplifier for drive 12 such that the output of the servomotor for drive 3 illustrated by a broken line of FIG. 2B is limited to a value smaller than the output before the abnormality detection by the abnormality detection unit 14 and to a value such that the output of the servomotor for drive 3 does not exceed the maximum supply electric power of the power supply unit 11. The form of the method of limiting the output of the servomotor for drive 3 by the control unit 15 is described later.

Further, as a variation of the present embodiment, the control unit 15 may control the operation of the servo amplifier for drive 12 such that, when an abnormality detection unit 15 detects the abnormality of the power storage device 13, an absolute value of the output of the servomotor for drive 3 does not exceed the limiting value set to a value smaller than the absolute value of the maximum supply electric power of the power supply unit 11. Considering the safety of the power supply unit 11, the limiting value may be set to a value smaller than the absolute value of the maximum supply electric power of the power supply unit 11 with a slight margin.

As the variation of the present embodiment, the control unit 15 may control the operation of the servo amplifier for drive 12 such that, when the abnormality detection unit 14 detects the abnormality of the power storage device 13, while limiting the output of the servomotor for drive 3 to a value smaller than the output before the abnormality detection by the abnormality detection unit 14, eventually the servomotor for drive 3 is stopped. In this manner, by stopping the servomotor for drive 3 at the time of occurrence of an abnormality of the power storage device 13, it is possible to avoid the abnormal operation or the breakage of the servomotor for drive and the breakage of the power supply unit 11 and the servo amplifier for drive 12 and the further safety is ensured. However, when the abnormality of the power storage device 13 is minor and there is no problem even if the driving is conducted while the output of the servomotor for drive 3 is lowered, it is not needed to stop the servomotor for drive 3. For example, the driving is conducted while lowering the output of the servomotor for drive 3, during the time period, the abnormality of the power storage device 13 is removed, and if the normal operation of the servomotor for drive 3 is restored after the power storage device 13 is returned to the normal state, sine the machines such as the machine tool and the robot incorporating the motor drive system do not stop, the economic loss can be minimized.

The notification unit 16 notifies the contents of the abnormality detected by the abnormality detection unit 14. In the illustrated embodiment, the notification unit 16 is provided in the numerical control device 1000 and is realized as, for example, the display attached to the numerical control device 1000. Further, for example, the notification unit 16 may be realized as displays such as a personal computer, a mobile terminal, and a touch panel. On the display as the notification unit 16, the contents of the abnormality detected by the abnormality detection unit 14 are displayed in characters or pictures. For example, the notification unit 16 may be realized by an audio device that emits sounds such as sound, speaker, buzzer, and chime and contents of the abnormality detected by the abnormality detection unit 14 are notified by sounds. For example, the notification unit 16 may take the form of, using a printer, printing out the contents on the paper sheet, etc., and displaying the contents. Alternatively, the notification unit 16 may be realized by appropriately combining the above. Further, the data on the content of the abnormality detected by the abnormality detection unit 14 may be stored in a storage device and the data may be used for a further use application.

Figure 3:
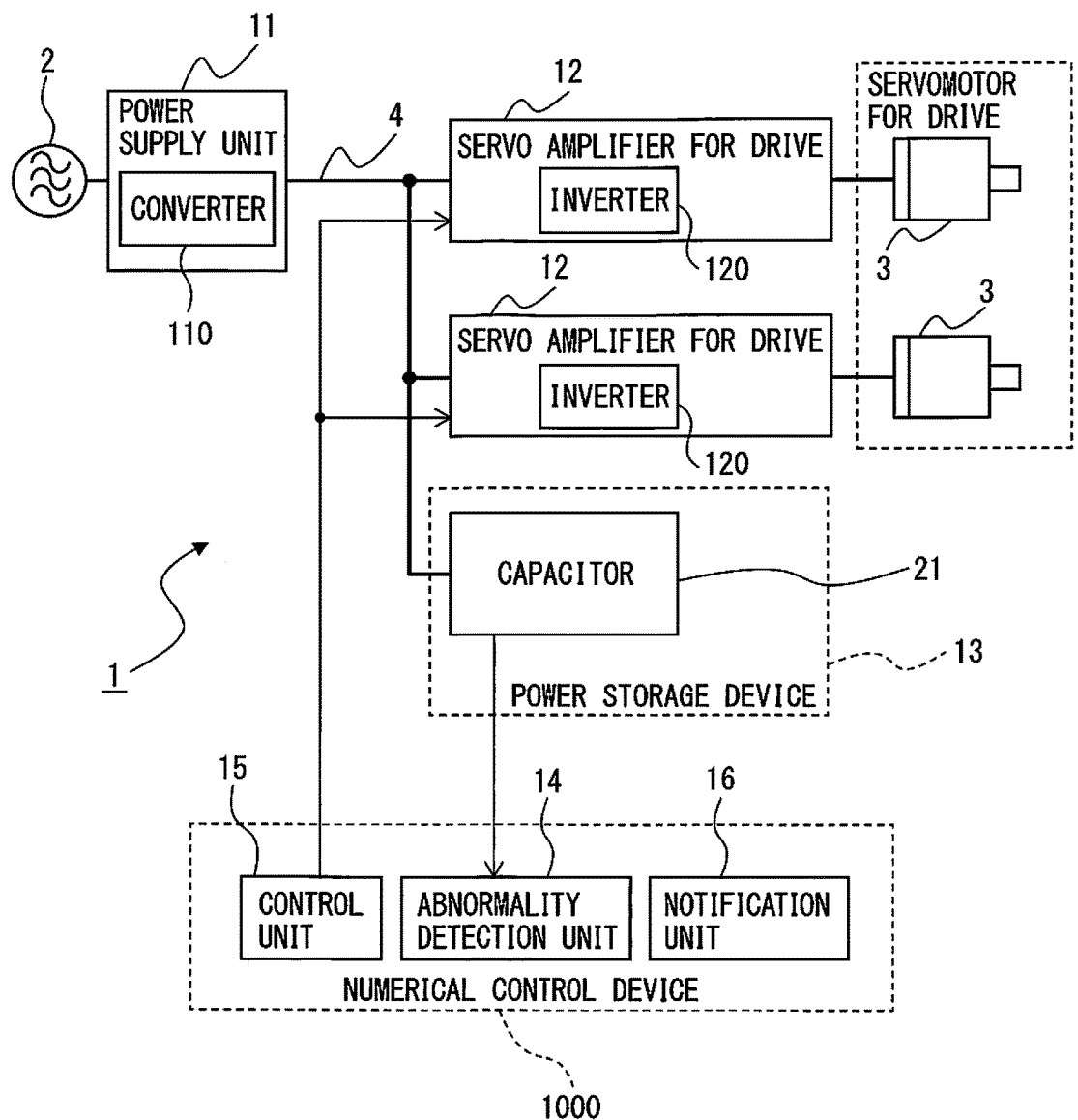
FIG. 3 is a block diagram when the power storage device in the motor drive system according to one embodiment is a capacitor.

FIG. 3 is a block diagram when the power storage device in the motor drive system according to one embodiment is a capacitor. When the power storage device 13 is configured from a capacitor 21 having the large capacity, the capacitor 21 is, for example, via a DC-DC converter (not illustrated), connected with the DC link 4. The DC power amount to be stored or supplied by the capacitor 21 in the power storage device 13 is controlled by the numerical control device 1000. In other words, the numerical control device 1000 outputs, to the DC-DC converter, a command for controlling the DC power amount to be stored (charged) or supplied (discharged) by the capacitor 21. When the command received from the numerical control device 1000 indicates the supply (discharge) of the DC power by the capacitor 21, the DC-DC converter performs the operation such that the DC voltage on a side to which the capacitor 21 is connected is larger than the DC voltage on a side to which the DC link 4 is connected, and accordingly, the energy stored in the capacitor 21 is caused to flow to the DC link 4 side. When the command received from the numerical control device 1000 indicates the storage (charging) of the DC power by the capacitor 21, the DC-DC converter performs the operation such that the DC voltage on a side to which the capacitor 21 is connected is smaller than the DC voltage on a side to which the DC link 4 is connected, and accordingly, the energy from the DC link 4 is caused to flow to the capacitor 21 side and the energy is caused to be stored in the capacitor 21. In FIG. 3, components other than the power storage device 13 configured from the capacitor 21 are similar to components in FIG. 1, and thus, like components are denoted with like reference numerals and detailed descriptions of the components are omitted.

The above described abnormality detection unit 14 and the control unit 15 may be constructed in, for example, a software program format or may be constructed by a combination of various electronic circuits and a software program. In the embodiment illustrated in FIG. 1 and FIG. 3, the abnormality detection unit 14 and the control unit 15 are constructed in the software program format, and an arithmetic process unit in the numerical control device 1000 operates the software program to realize functions of each unit. The control unit 15 in the numerical control device 1000 does not indicate the control system itself executing numerical control processing that is inherently executed by the numerical control device 1000 but is for performing the process of limiting the output of the servomotor for drive 3 at the time of occurrence of an abnormality of the power storage device 13.

A computer that operates based on the software program medium that realizes the functions of the abnormality detection unit 14 and the control unit 15 may be provided separately from the numerical control device 1000. Alternatively, the abnormality detection unit 14 and the control unit 15 may be realized as a semiconductor integrated circuit to which the software program medium that realizes the functions of each unit is written, and in this case, to the semiconductor integrated circuit, for example, the existing numerical control device is attached to realize functions of each unit.

FIG. 4 is a flowchart illustrating the operation flow of the control unit in the motor drive system according to one embodiment.

The servo amplifier for drive 12, based on the command of the numerical control device 1000, using the DC power supplied from the power supply unit 11, drives the servomotor for drive 3 (step S101). During this time period, the abnormality detection unit 14 constantly monitors the operation of the power storage device 13. When the power storage device 13 normally operates, among the electric power needed for driving the servomotor for drive 3, the amount exceeding the maximum supply electric power of the power supply unit 11 is supplemented by the electric power supplied from the power storage device 13 to the DC link 4.

At step S102, the abnormality detection unit 14 determines whether, to the power storage device 13, the abnormality occurs. When the abnormality detection unit 14 detects the abnormality of the power storage device 13, the process advances to step S103, and otherwise (i.e., when the power storage device 13 is normal), the process returns to step S101.

At step S103, the control unit 15 controls the operation of the servo amplifier for drive 12 such that the output of the servomotor for drive 3 is limited to a value smaller than the output before the abnormality detection by the abnormality detection unit 14.

Subsequently, several methods of limiting the output of the servomotor for drive 3 by the control unit 15 are listed. Prior to this, an operation example of the servomotor for drive 3 that is driven by the motor drive system 1 according to one embodiment when the power storage device 13 normally operates is described with reference to FIG. 5A to FIG. 5C.

FIG. 5A is a drawing exemplifying the operation of the servomotor for drive when the power storage device normally operates, which servomotor for drive is driven by the motor drive system according to one embodiment and illustrates the output of the servomotor for drive. FIG. 5B is drawing exemplifying the operation of the servomotor for drive when the power storage device normally operates, which servomotor for drive is driven by the motor drive system according to one embodiment and illustrates the rotational speed of the servomotor for drive. FIG. 5C is a drawing exemplifying the operation of the servomotor for drive when the power storage device normally operates, which servomotor for drive is driven by the motor drive system according to one embodiment and illustrates the torque of the servomotor for drive. In FIG. 5A to FIG. 5C, FIG. 6A to FIG. 6C described later and FIG. 7A to FIG. 7C, as one example, the servomotor for drive 3 is driven at the acceleration from time 0 to time $t_1$, at a constant speed from time $t_1$ to time $t_2$, at the deceleration from time $t_2$ to time $t_3$, at a constant speed from time $t_3$ to time $t_4$, and at the deceleration at or after time $t_4$. The maximum supply electric power of the power supply unit 11 is indicated by the dot-and-dash line.

When the power storage device 13 normally operates, from time 0 to time $t_1$, if the servo amplifier for drive 12 accelerates the servomotor for drive 3, the rotational speed of the servomotor for drive 3 increases with a positive torque (FIG. 5C) (FIG. 5B). Since the output of the servomotor for drive 3 (i.e., electric power needed for driving the servomotor for drive 3) is determined based on "torque×rotational speed," as illustrated in FIG. 5A, the output increases. When the output of the servomotor for drive 3 exceeds the maximum supply electric power of the power supply unit 11 (indicated by dot-and-dash line), among the electric power needed for driving the servomotor for drive 3, the amount exceeding the maximum supply electric power of the power supply unit 11 is supplemented by the electric power supplied from the power storage device 13 to the DC link 4. In general, the electric power needed for driving the servomotor for drive 3 at the constant speed is set within the range not exceeding the maximum supply electric power of the power supply unit 11. From time $t_1$ to time $t_2$, if the servo amplifier for drive 12 drives the servomotor for drive 3 at the constant speed, the output of the servomotor for drive 3 is constant within the range not exceeding the maximum supply electric power of the power supply unit 11. From time $t_2$ to time $t_3$, if the servo amplifier for drive 12 decelerates the servomotor for drive 3, the rotational speed of the servomotor for drive 3 decreases with a negative torque (FIG. 5C) (FIG. 5B), the output of the servomotor for drive 3 is negative as illustrated in FIG. 5A, and the electric power is regenerated. From time $t_3$ to time $t_4$, if the servo amplifier for drive 12 drives the servomotor for drive 3 again at the constant speed, the output of the servomotor for drive 3 is constant within the range not exceeding the maximum supply electric power of the power supply unit 11. At or after time $t_4$, if the servo amplifier for drive 12 decelerates the servomotor for drive 3 again with a larger negative torque (FIG. 5C) than a negative torque during a time period from time $t_2$ to time $t_3$, the rotational speed of the servomotor for drive 3 decreases as illustrated in FIG. 5B, the output of the servomotor for drive 3 is negative as illustrated in FIG. 5A, and the electric power is regenerated. If the electric power regenerated from the servomotor for drive 3 exceeds a maximum regenerative power of a converter 11 in the power supply unit 11, the excess electric power is stored in the power storage device 13 as DC power.

Figure 6A:
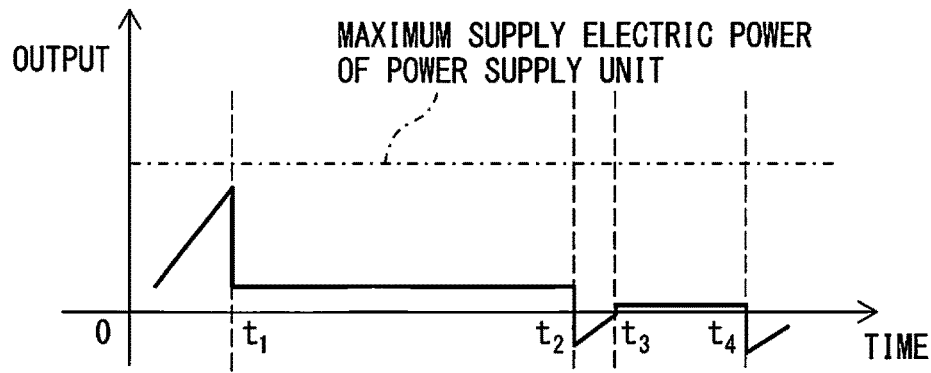
FIG. 6A is a drawing exemplifying the operation of the servomotor for drive whose output is limited by the first form at the time of occurrence of an abnormality of the power storage device, which servomotor for drive is driven by the motor drive system according to one embodiment and illustrates the output of the servomotor for drive.
Figure 6B:
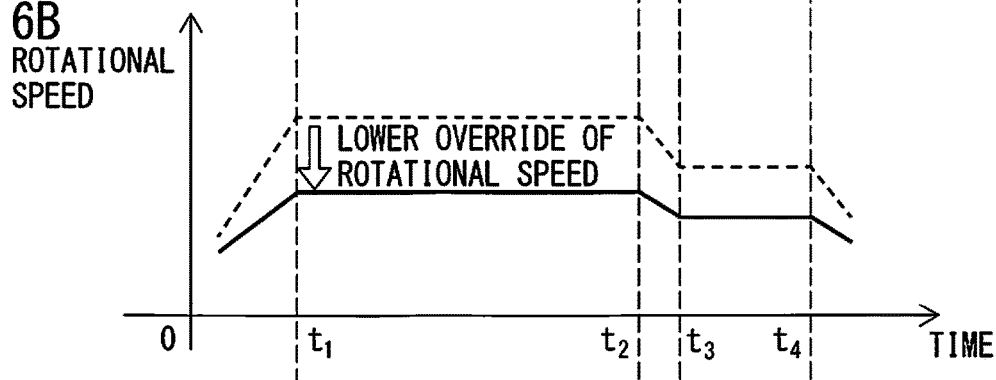
FIG. 6B is a drawing exemplifying the operation of the servomotor for drive whose output is limited by the first form at the time of occurrence of an abnormality of the power storage device, which servomotor for drive is driven by the motor drive system according to one embodiment and illustrates the rotational speed of the servomotor for drive.
Figure 6C:
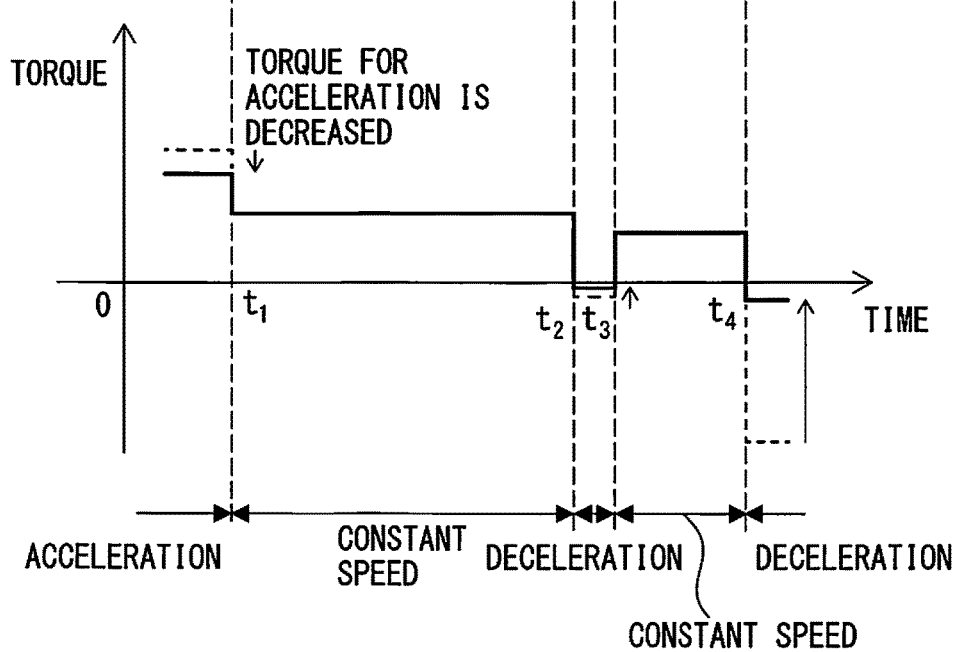
FIG. 6C is a drawing exemplifying the operation of the servomotor for drive whose output is limited by the first form at the time of occurrence of an abnormality of the power storage device, which servomotor for drive is driven by the motor drive system according to one embodiment and illustrates the torque of the servomotor for drive.

In the first form of the method of limiting the output of the servomotor for drive 3 by the control unit 15, the override relative to the speed command is changed to a value smaller than the value set before the abnormality detection by the abnormality detection unit 14 so as to limit the output of the servomotor for drive 3. FIG. 6A is a drawing exemplifying the operation of the servomotor for drive whose output is limited by the first form at the time of occurrence of an abnormality of the power storage device, which servomotor for drive is driven by the motor drive system according to one embodiment and illustrates the output of the servomotor for drive. FIG. 6B is a drawing for exemplifying the operation of the servomotor for drive whose output is limited by the first form at the time of occurrence of an abnormality of the power storage device, which servomotor for drive is driven by the motor drive system according to one embodiment and illustrates the rotational speed of the servomotor for drive. FIG. 6C is a drawing exemplifying the operation of the servomotor for drive whose output is limited by the first form at the time of the occurrence of an abnormality of the power storage device, which servomotor for drive is driven by the motor drive system according to one embodiment and illustrates the torque of the servomotor for drive.

In the first form, when the abnormality detection unit 14 detects the abnormality of the power storage device 13, in a range in which the output of the servomotor for drive 3 does not exceed the maximum supply electric power of the power supply unit 11, the control unit 15 changes the override relative to the speed command to a value smaller than the value set before the abnormality detection by the abnormality detection unit 14 and controls the operation of the servo amplifier for drive 12. In general, in the numerical control device 1000, by multiplying the speed command for the servomotor for drive 3 by the magnification called "override," the rotational speed can be corrected. With respect to the speed command, the override of, for example, 0 to 200% can be set, and it is general that in the numerical control device 1000, a dial for setting the override is provided. In the first form, when the abnormality detection unit 14 detects the abnormality of the power storage device 13, regardless of the setting of the dial, the control unit 15 automatically changes the override to a value smaller than the value set before the abnormality detection by the abnormality detection unit 14. When the override is lowered, as illustrated in FIG. 6B, the rotational speed of the servomotor for drive 3 is decreased as a whole. If the override is lowered, since the target rotational speed of the servomotor for drive 3 decreases, the acceleration and the deceleration until the actual rotational speed reaches the target rotational speed also decrease, and as illustrated in FIG. 6C, the torque during the acceleration and the deceleration also decreases. As a result, as illustrated in FIG. 6A, the output of the servomotor for drive 3 (i.e., electric power needed for driving the servomotor for drive 3) decreases. In the first form, the override used at the time of occurrence of an abnormality of the power storage device 13 is set to a value at which the output of the servomotor for drive 3 does not exceed the maximum supply electric power of the power supply unit 11 (FIG. 6A). As a specific way of setting the override used at the time of occurrence of an abnormality of the power storage device 13, for example, the method is conceivable in which, to simulate the occurrence of the abnormality of the power storage device 13, from the motor drive system 1, the power storage device 13 is removed, the servomotor for drive 3 is accelerated to measure or calculate the output of the servomotor for drive 3 at that time, and the override in which the measured and calculated output does not exceed the maximum supply electric power of the power supply unit 11 is found.

In the second form of the method of limiting the output of the servomotor for drive 3 by the control unit 15, in a range in which the output of the servomotor for drive 3 does not exceed the maximum supply electric power of the power supply unit 11, the torque command is limited to a value smaller than the torque command before the abnormality detection by the abnormality detection unit 14 so as to limit the output of the servomotor for drive 3. Further, in the third form of the method of limiting the output of the servomotor for drive 3 by the control unit 15, in a range in which the output of the servomotor for drive 3 does not exceed the maximum supply electric power of the power supply unit 11, by accelerating and decelerating the servomotor for drive with the acceleration and the deceleration that are limited to values smaller than the acceleration and the deceleration before the abnormality detection by the abnormality detection unit 14, the output of the servomotor for drive 3 is limited. Both of the second form and the third form are described with reference to FIG. 7A to FIG. 7C.

FIG. 7A is a drawing exemplifying the operation of the servomotor for drive whose output is limited by the second form and the third form at the time of occurrence of an abnormality of the power storage device, which servomotor for drive is driven by the motor drive system according to one embodiment and illustrates the output of the servomotor for drive. FIG. 7B is a drawing exemplifying the operation of the servomotor for drive whose output is limited by the second form and the third form at the time of occurrence of an abnormality of the power storage device, which servomotor for drive is driven by the motor drive system according to one embodiment and illustrates the rotational speed of the servomotor for drive. FIG. 7C is a drawing exemplifying the operation of the servomotor for drive whose output is limited by the second form and the third form at the time of occurrence of an abnormality of the power storage device, which servomotor for drive is driven by the motor drive system according to one embodiment and illustrates the torque of the servomotor for drive.

In the second form, when the abnormality detection unit 14 detects the abnormality of the power storage device 13, in a range in which the output of the servomotor for drive 3 does not exceed the maximum supply electric power of the power supply unit 11, based on the torque command that is limited to a value smaller than the torque command before the abnormality detection by the abnormality detection unit 14, the control unit 15 controls the operation of the servo amplifier for drive 12. When the torque command is lowered, as illustrated in FIG. 7C, the absolute value of the torque of the servomotor for drive 3 is small as a whole. Further, since the output of the servomotor for drive 3 (i.e., electric power needed for driving the servomotor for drive 3) is determined by "torque×rotational speed," as illustrated in FIG. 7A, the output is decreased. In the second form, the torque command used at the time of occurrence of an abnormality of the power storage device 13 is set to a value at which the output of the servomotor for drive 3 does not exceed the maximum supply electric power of the power supply unit 11 (FIG. 7A). As a specific way of setting the torque command used at the time of occurrence of an abnormality of the power storage device 13, a method is conceivable in which, for example, to simulate the occurrence of the abnormality of the power storage device 13, from the motor drive system 1, the power storage device 13 is removed, the servomotor for drive 3 is operated based on various torque commands, the output of the servomotor for drive 3 at that time is measured or calculated, and the torque command in which the measured or calculated output does not exceed the maximum supply electric power of the power supply unit 11 is found.

In the third form, when the abnormality detection unit 14 detects the abnormality of the power storage device 13, in the range in which the output of the servomotor for drive 3 does not exceed the maximum supply electric power of the power supply unit 11, the control unit 15 controls the operation of the servo amplifier for drive 12 such that the servomotor for drive 3 accelerates and decelerates at the acceleration and the deceleration that are limited to values smaller than the acceleration and the deceleration before the abnormality detection by the abnormality detection unit 14. If the acceleration and the deceleration of the servomotor for drive 3 are lowered (FIG. 7B), the output of the servomotor for drive 3 (i.e., electric power needed for driving the servomotor for drive 3) is, as illustrated in FIG. 7A, decreased. In the third form, the acceleration and the deceleration of the servomotor for drive 3 at the time of occurrence of an abnormality of the power storage device 13 are set to values at which the output of the servomotor for drive 3 does not exceed the maximum supply electric power of the power supply unit 11 (FIG. 7A). As a specific way of setting the acceleration and the deceleration of the servomotor for drive 3 used at the time of occurrence of an abnormality of the power storage device 13, a method is conceivable in which, for example, to simulate the occurrence of the abnormality of the power storage device 13, from the motor drive system 1, the power storage device 13 is removed, the servomotor for drive 3 is operated based on various accelerations and decelerations, the output of the servomotor for drive 3 at that time is measured or calculated, and, the acceleration and the deceleration in which the measured or calculated output does not exceed the maximum supply electric power of the power supply unit 11 are found.

In the motor drive system 1 according to one embodiment illustrated in FIG. 1 and FIG. 3, as one example, the number of the servo amplifier for drive 12 is two, but the number may be one or three or more. In case that the number of the servo amplifier for drive 12 is one, the control unit 15, at the time of occurrence of an abnormality of the power storage device 13, controls the operation of the single servo amplifier for drive 12 so that the output of the servomotor for drive 3 that is connected with the single servo amplifier for drive 12 is limited to a value smaller than the output before the abnormality detection by the abnormality detection unit 14. In case that the servo amplifiers for drive 12 are provided corresponding to the servomotors for drive 3, the control unit 15, at the time of occurrence of an abnormality of the power storage device 13, controls the operation of at least one servo amplifier for drive from among the servo amplifiers for drive 12 so that the output of the servomotor for drive 3 corresponding to the servo amplifier for drive to be controlled is limited to a value smaller than the output before the abnormality detection by the abnormality detection unit 14. In the examples illustrated in, for example, FIG. 1 and FIG. 3, the control unit 15 may, at the time of occurrence of an abnormality of the power storage device 13, control the single servo amplifier for drive 12, control the two servo amplifiers for drive 12, or alternately control the servo amplifiers for drive 12 one by one.

In the machine tool and the robot, the power storage devices and the power supply units are provided, and there is a case where a single numerical control device controls the servo amplifiers for drive. The motor drive system according to one embodiment can be also applied in case that the power supply units and the power storage devices are provided. This will be explained with some specific examples.

Figure 8:
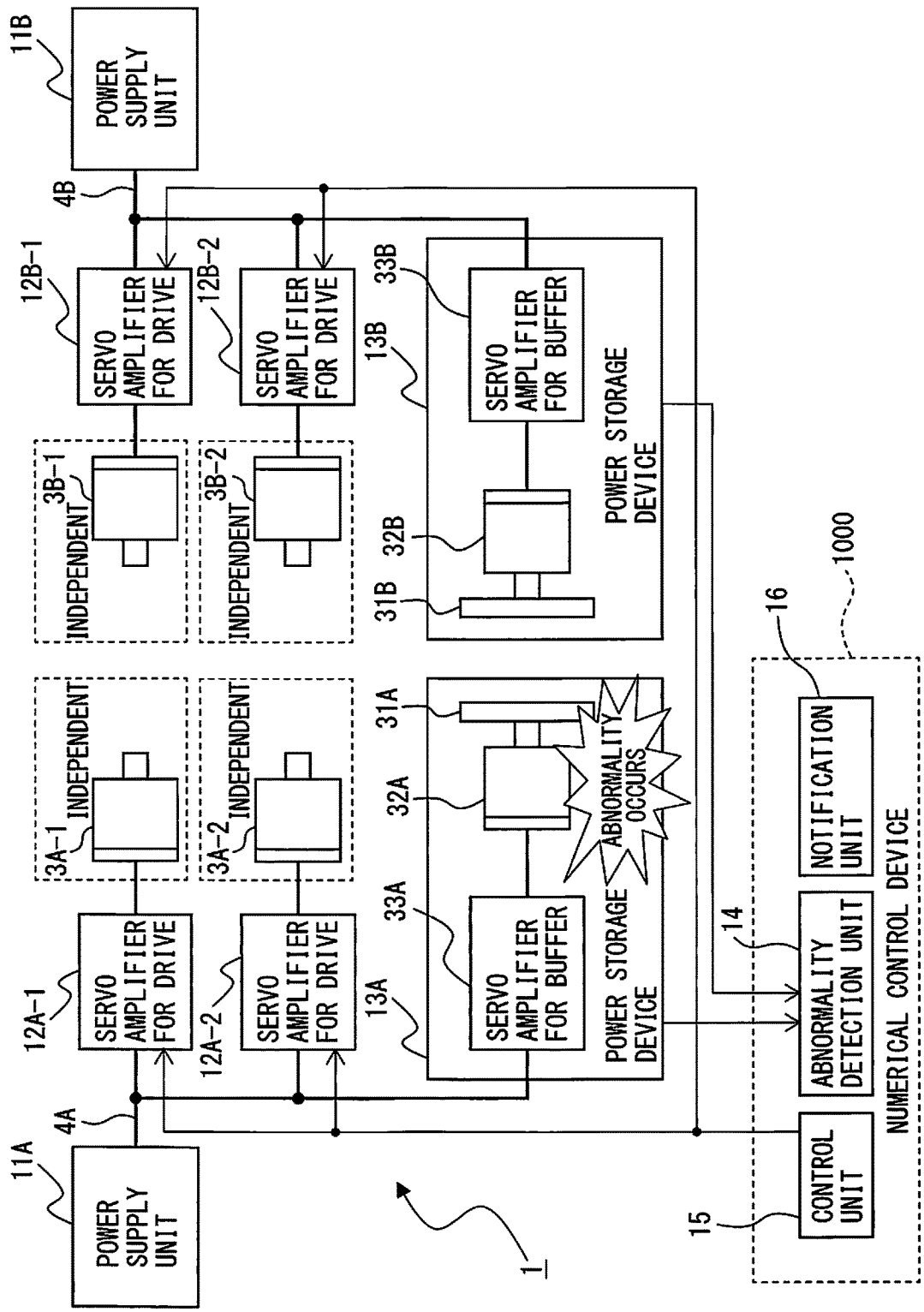
FIG. 8 is a block diagram illustrating a first specific example in which, in the motor drive system according to one embodiment, the power storage devices and the power supply units are provided and a single numerical control device controls the servo amplifiers for drive.
Figure 9:
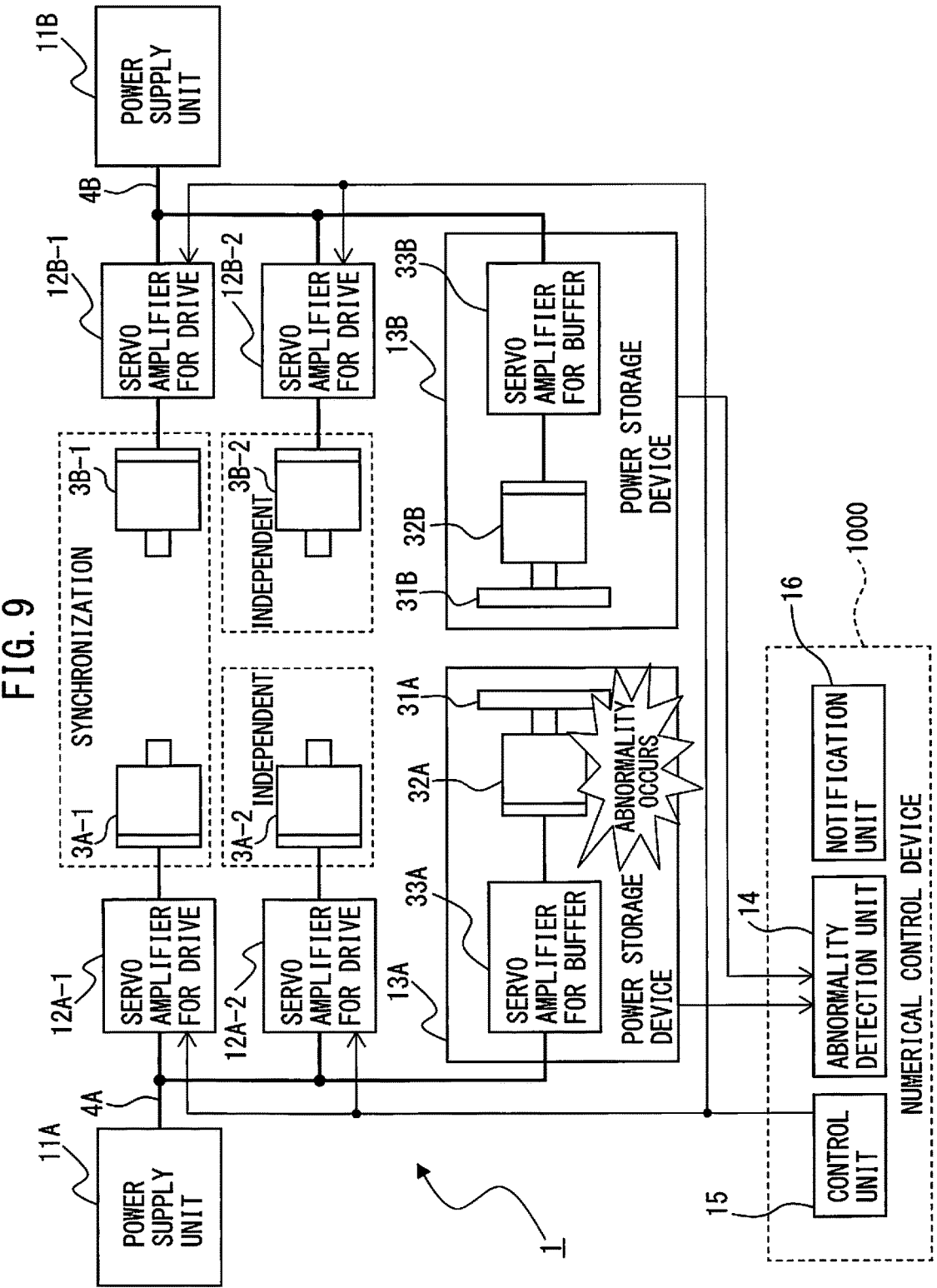
FIG. 9 is a block diagram illustrating a second specific example in which, in the motor drive system according to one embodiment, the power storage devices and the power supply units are provided and a single numerical control device controls the servo amplifiers for drive.

FIG. 8 is a block diagram illustrating the first specific example in which, in the motor drive system according to one embodiment, the power storage devices and the power supply units are provided and a single numerical control device controls the servo amplifiers for drive. FIG. 9 is a block diagram illustrating the second specific example in which, in the motor drive system according to one embodiment, the power storage devices and the power supply units are provided and a single numerical control device controls the servo amplifiers for drive. Further, FIG. 10 is a block diagram illustrating the third specific example in which, in the motor drive system according to one embodiment, the power storage devices and the power supply units are provided and a single numerical control device controls the servo amplifiers for drive.

Figure 10:
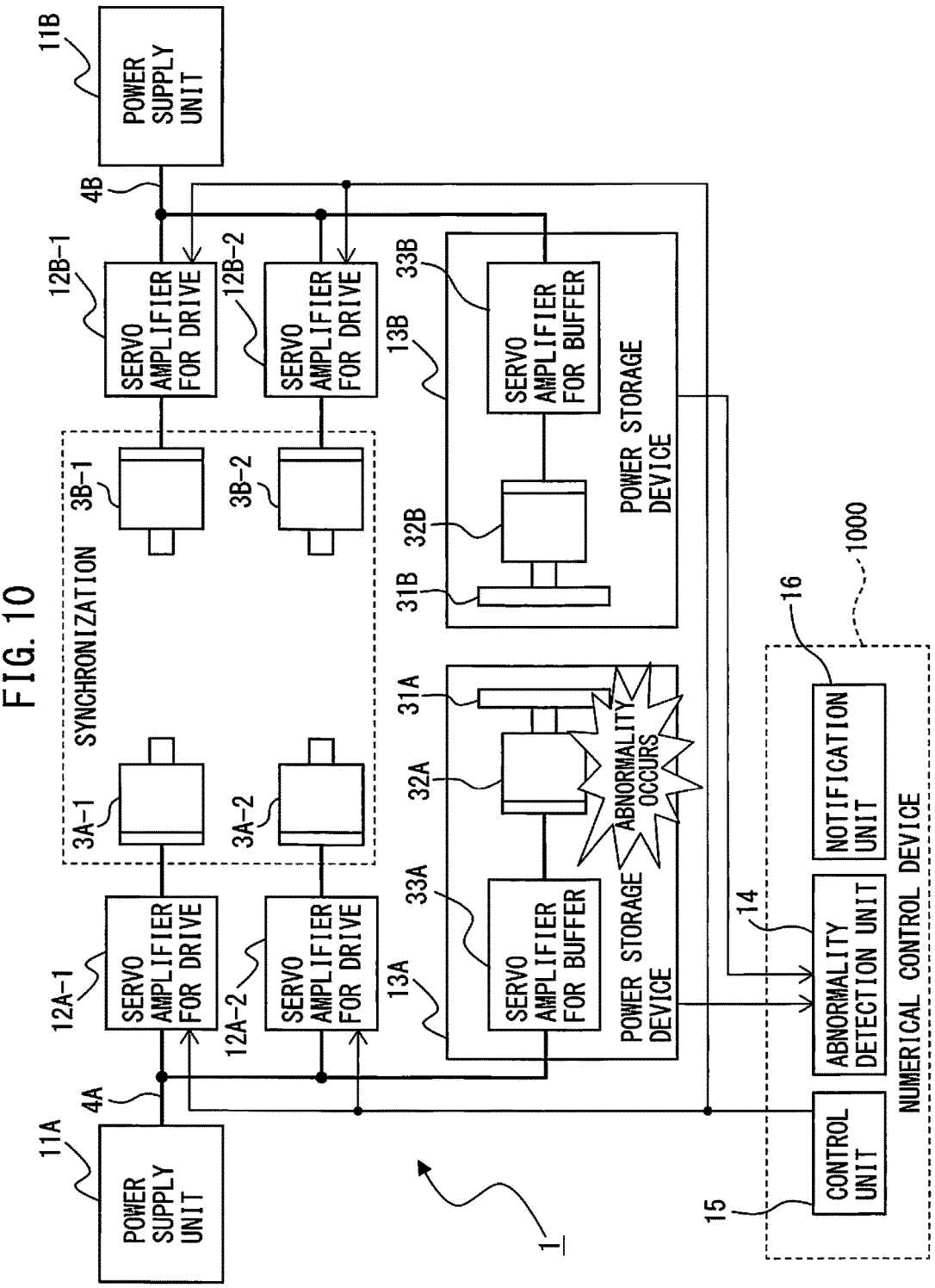
FIG. 10 is a block diagram illustrating a third specific example in which, in the motor drive system according to one embodiment, the power storage devices and the power supply units are provided and a single numerical control device controls the servo amplifiers for drive.

As illustrated in FIG. 8 to FIG. 10, with respect to a single numerical control device 1000, the power storage devices 13A and 13B and the power supply units 11A and 11B are provided. The servo amplifiers for drive 12A-1 and 12A-2 and the power storage device 13A are connected to the DC link 4A that receives DC power from the power supply unit 11A. The power storage device 13A includes the flywheel 31A, the servomotor for buffer 32A, and the servo amplifier for buffer 33A. The servo amplifiers for drive 12B-1 and 12B-2 and the power storage device 13B are connected to the DC link 4B that receives DC power from the power supply unit 11B. The power storage device 13B includes the flywheel 31B, the servomotor for buffer 32B, and the servo amplifier for buffer 33B. In the first to the third specific examples illustrated in FIG. 8 to FIG. 10, the number of the power storage device and the power supply unit is two, but the number may be three or more. In FIG. 8 to FIG. 10, the converter in the power supply unit and the inverter in each servo amplifier are not illustrated.

The first specific example illustrated in FIG. 8 indicates the operation of the motor drive system 1 when all of the servomotors for drive 3A-1, 3A-2, 3B-1 and 3B-2 are independent in their operations.

When the abnormality detection unit 14 detects the abnormality of any one of the power storage devices 13A and 13B, the control unit 15 controls the operation of at least one servo amplifier for drive among the servo amplifiers for drive connected with the DC link to which the power storage device having the abnormality is connected, so that the output of the servomotor for drive corresponding to the servo amplifier for drive to be controlled is limited to a value smaller than the output before the abnormality detection by the abnormality detection unit 14. However, the above described control by the control unit 15 when the abnormality detection unit 14 detects the abnormality of the power storage device is performed such that the output of the servomotor for drive corresponding to the servo amplifier for drive to be controlled does not exceed the maximum supply electric power of the power supply unit to which the servo amplifier for drive to be controlled is connected. For example, when the abnormality detection unit 14 detects the abnormality of the power storage device 13A, the control unit 15 controls, among the servo amplifiers for drive 12A-1 and 12B-1 connected with the DC link 4A to which the power storage device 13A having the abnormality is connected, the operation of at least one servo amplifier for drive 12A-1 and 12B-1 so that the output of the servomotor for drive corresponding to the servo amplifier for drive to be controlled is limited to "a value smaller than the output before the abnormality detection by the abnormality detection unit 14" and "a value such that the output of the servomotor for drive does not exceed the maximum supply electric power of the power supply unit to which the servo amplifier for drive to be controlled is connected." For example, the control unit 15, at the time of occurrence of an abnormality of the power storage device 13A, may control the servo amplifier for drive 12A-1 to limit the output of the servomotor for drive 3A-1, control the servo amplifier for drive 12A-2 to limit the output of the servomotor for drive 3A-2, conduct the above alternately, or control both the servo amplifiers for drive 12A-1 and 12A-2 to limit the outputs of both the servomotors for drive 3A-1 and 3A-2.

The second specific example illustrated in FIG. 9 indicates the operation of the motor drive system 1 when the servomotors for drive 3A-1 and 3B-1 are synchronized regarding the operation. For example, this corresponds to when, for example, a drive shaft of the servomotor for drive 3A-1 and a drive shaft of the servomotor for drive 3B-1 are, via some sort of mechanism or member, physically coupled.

When the abnormality detection unit 14 detects the abnormality of at least one power storage device from among the power storage devices 13A and 13B, the control unit 15 controls, among the servo amplifiers for drive connected with the DC link to which the power storage device having the abnormality is connected, the operation of the at least one servo amplifier for drive and, among the servo amplifiers for drive connected with a DC link different from the DC link to which the power storage device having the abnormality is connected, the operation of the at least one servo amplifier for drive so that the output of the servomotor for drive corresponding to the servo amplifier for drive to be controlled is limited to a value smaller than the output before the abnormality detection by the abnormality detection unit 14. However, the above described control by the control unit 15 when the abnormality detection unit 14 detects the abnormality of the power storage device is performed such that the output of the servomotor for drive corresponding to the servo amplifier for drive to be controlled does not exceed the maximum supply electric power of the power supply unit to which the servo amplifier for drive to be controlled is connected. For example, when the abnormality detection unit 14 detects the abnormality of the power storage device 13A, the control unit 15 controls the servo amplifier for drive 12A-1 connected with the DC link 4A to which the power storage device 13A having the abnormality is connected to limit the output of the servomotor for drive 3A-1 and controls the operation of the servo amplifier for drive 12B-1 such that the output of the servomotor for drive 3B-1 that is synchronized with the servomotor for drive 3A-1 is limited. In other words, the output of the servomotor for drive 3A-1 is limited to a value smaller than the output before the abnormality detection by the abnormality detection unit 14 and to a value such that the output of the servomotor for drive 3A-1 does not exceed the maximum supply electric power of the power supply unit 11A, and the output of the servomotor for drive 3B-1 that is synchronized with the servomotor for drive 3A-1 is limited to a value smaller than the output before the abnormality detection by the abnormality detection unit 14 and a value such that the output of the servomotor for drive 3B-1 does not exceed the maximum supply electric power of the power supply unit 11B. The reason why, when the control unit 15 controls the servo amplifier for drive 12A-1 connected with the DC link 4A to which the power storage device 13A having the abnormality is connected, the control unit 15 also controls the servo amplifier for drive 12B-1 connected with the DC link 4B that is different from the DC link 4A, is because the synchronized servomotor for drive 3A-1 and servomotor for drive 3B-1 need to operate similarly, and if the servomotor for drive 3A-1 and the servomotor for drive 3B-1 perform the separate operations, the mechanism or the member for coupling drive shaft of the servomotor for drive 3A-1 and the drive shaft of the servomotor for drive 3B-1 is damaged. On the other hand, since the servomotors for drive 3A-2 and 3B-2 are independent with each other in the operations, when the control unit 15, for example, controls the servo amplifier for drive 12A-2 connected with the DC link 4A to which the power storage device 13A having the abnormality is connected to limit the output of the servomotor for drive 3A-2, it does not need to limit the output of the servomotor for drive 3B-2 that operates independently, and thus, the control unit 15 does not control the servo amplifier for drive 12B-2.

The third specific example illustrated in FIG. 10 indicates the operation of the motor drive system 1 when the servomotors for drive 3A-1, 3B-1, 3A-2 and 3B-2 are synchronized in the operations. For example, this corresponds to when a drive shaft of the servomotor for drive 3A-1, the drive shaft of the servomotor for drive 3A-2, a drive shaft of the servomotor for drive 3B-1, and the drive shaft of the servomotor for drive 3B-2 are physically coupled via some sort of mechanisms or members.

Since all of the servomotors for drive 3A-1, 3B-1, 3A-2 and 3B-2 are synchronized, when the abnormality detection unit 14 detects the abnormality of either the power storage device 13A or 13B, the control unit 15 controls the operations of all of the servo amplifiers for drive 12A-1, 12B-1, 12B-1, and 12B-2 so that the output of the servomotor for drive 3A-1, 3B-1, 3A-2 and 3B-2 is limited to a value smaller than the output before the abnormality detection by the abnormality detection unit. However, the above described control by the control unit 15 when the abnormality detection unit 14 detects the abnormality of the power storage device is performed such that the output of the servomotor for drive 3A-1 and 3A-2 does not exceed the maximum supply electric power of the power supply unit 11A and the output of the servomotor for drive 3B-1 and 3B-2 does not exceed the maximum supply electric power of the power supply unit 11B. In this manner, the reason why the control unit 15 controls all of the servo amplifiers for drive 12A-1, 12A-2, 12B-1 and 12B-2 instead of the servo amplifier for drive 12A-1 and/or 12A-2 connected with the DC link 4A to which the power storage device 13A having the abnormality is connected is because all of the synchronized servomotors for drive 3A-1, 3A-2, 3B-1 and 3B-2 need to perform the similar operations and if one of these servomotors for drive performs the separate operation, the mechanism or the member for coupling the respective drive shafts is damaged.

In the above described first to the third specific examples, the notification unit 16 may notify identification information indicating, among the power storage devices 13A and 13B, to which power storage device, the abnormality occurs and the contents of the abnormality.

In the above described first to the third specific examples, as the power storage device 13A and 13B, a flywheel is used, but the use of the capacitor is similarly applicable, or the use of the combination of the flywheel and the capacitor is similarly applicable.

According to one aspect of the present disclosure, in the motor drive system in which the power storage device is provided to the DC link that connects the power supply unit with the servo amplifier for drive, even if, to the power storage device, the abnormality occurs, efficient driving and safety of the servomotor for drive can be ensured.

The invention claimed is:

1. A motor drive system comprising:
 a power supply unit configured to supply DC power to a DC link;
 a servo amplifier for drive configured to convert DC power in the DC link to AC power and supplies the AC power to a servomotor for drive as a driving power;
 a power storage device configured to store DC power from the DC link and supplies DC power to the DC link;
 an abnormality detection unit configured to detect an abnormality of the power storage device; and
 a control unit configured to control an operation of the servo amplifier for drive such that when the abnormality detection unit detects an abnormality of the power storage device, an output of a servomotor for drive is limited to a value smaller than an output before an abnormality detection by the abnormality detection unit,
 wherein the control unit controls an operation of the servo amplifier for drive such that when the abnormality detection unit detects an abnormality of the power storage device, an absolute value of an output of a servomotor for drive does not exceed a limiting value set to a value smaller than an absolute value of a maximum supply electric power of the power supply unit.

2. The motor drive system according to claim 1, wherein the control unit, when the abnormality detection unit detects an abnormality of the power storage device, changes an override relative to a speed command to a value smaller than a value set before an abnormality detection by the abnormality detection unit and controls an operation of the servo amplifier for drive.

3. The motor drive system according to claim 1, wherein the control unit, when the abnormality detection unit detects an abnormality of the power storage device, based on a torque command limited to a value smaller than a torque command before an abnormality detection by the abnormality detection unit, controls an operation of the servo amplifier for drive.

4. The motor drive system according to claim 1, wherein the control unit controls an operation of the servo amplifier for drive such that when the abnormality detection unit detects an abnormality of the power storage device, a servomotor for drive is accelerated and decelerated at an acceleration and a deceleration limited to a value smaller than an acceleration and a deceleration before an abnormality detection by the abnormality detection unit.

5. The motor drive system according to claim 1, wherein the control unit controls an operation of the servo amplifier for drive such that when the abnormality detection unit detects an abnormality of the power storage device, a servomotor for drive is stopped while an output of a servomotor for drive is limited to a value smaller than an output before an abnormality detection by the abnormality detection unit.

6. The motor drive system according to claim 1, further comprising:
 a notification unit configured to notify a content of the abnormality detected by the abnormality detection unit.

7. A motor drive system comprising:
 a power supply unit configured to supply DC power to a DC link;
 a servo amplifier for drive configured to convert DC power in the DC link to AC power and supplies the AC power to a servomotor for drive as a driving power;

a power storage device configured to store DC power from the DC link and supplies DC power to the DC link;

an abnormality detection unit configured to detect an abnormality of the power storage device; and a control unit configured to control an operation of the servo amplifier for drive such that when the abnormality detection unit detects an abnormality of the power storage device, an output of a servomotor for drive is limited to a value smaller than an output before an abnormality detection by the abnormality detection unit, wherein a plurality of the servo amplifiers for drive are provided corresponding to a plurality of servomotors for drive;

a plurality of the power supply units configured to supply DC power to a connected DC link are provided;

the power storage device is connected with a DC link corresponding to each of the power supply unit; and the control unit, when the abnormality detection unit detects an abnormality of at least one power storage device among a plurality of the power storage devices, controls an operation of at least one servo amplifier for drive among the plurality of the servo amplifiers for drive connected with a DC link to which a power storage device having the abnormality is connected so that an output of a servomotor for drive corresponding to the servo amplifier for drive to be controlled is limited to a value smaller than an output before an abnormality detection by the abnormality detection unit.

8. The motor drive system according to claim 7, wherein the control unit, when the abnormality detection unit detects an abnormality of at least one power storage device from among the plurality of power storage devices, controls an operation of at least one servo amplifier for drive from among the plurality of servo amplifiers for drive connected with a DC link to which a power storage device having the abnormality is connected and controls an operation of at least one servo amplifier for drive from among the plurality of servo amplifiers for drive connected to a DC link different from the DC link to which a power storage device having the abnormality is connected so that an output of the servomotor for drive corresponding to the servo amplifier for drive to be controlled is limited to a value smaller than the output before an abnormality detection by the abnormality detection unit.

* * * * *